SYNCHRONOUS SELECTIVITY RECEIVER

Filed April 25, 1960

INVENTOR,
ALBERT C. COLAGUORI.
BY Harry M. Saragovitz
ATTORNEY.

United States Patent Office 2,976,408
Patented Mar. 21, 1961

2,976,408

SYNCHRONOUS SELECTIVITY RECEIVER

Albert C. Colaguori, Long Branch, N.J., assignor to the United States of America as represented by the Secretary of the Army Filed Apr. 25, 1960, Ser. No. 24,630
8 Claims. (Cl. 250—20)
(Granted under Title 35, U.S. Code (1952), sec. 266)

The invention described herein may be manufactured and used by or for the Government for governmental purposes without the payment to me of any royalty thereon.

The present invention relates to a frequency-modulation receiver, and more particularly to such a receiver wherein a narrow-band intermediate-frequency filter, capable of being synchronized in frequency with the deviation of the signal applied to it, permits the passage of all the transmitted intelligence, and at the same time improves the signal-to-noise ratio of the receiver.

The advantages achieved by the present invention over the prior art are the provision of a frequency-modulation receiver having an increased communication range, a greater adjacent channel rejection, and an improved signal-to-noise ratio.

These advantages are accomplished by having the center frequency of a tunable narrow-band intermediate-frequency system follow the frequency of the incoming signal. The phases of the input and output signals of one filter of the intermediate-frequency system are compared in a phase comparator, one of the signals having been shifted 90 degrees by a 90 degree phase shift network. The output signal from the phase comparator is applied as a control voltage to the narrow-band filters in the tunable intermediate-frequency system to vary the center frequency thereof.

Figure 1:
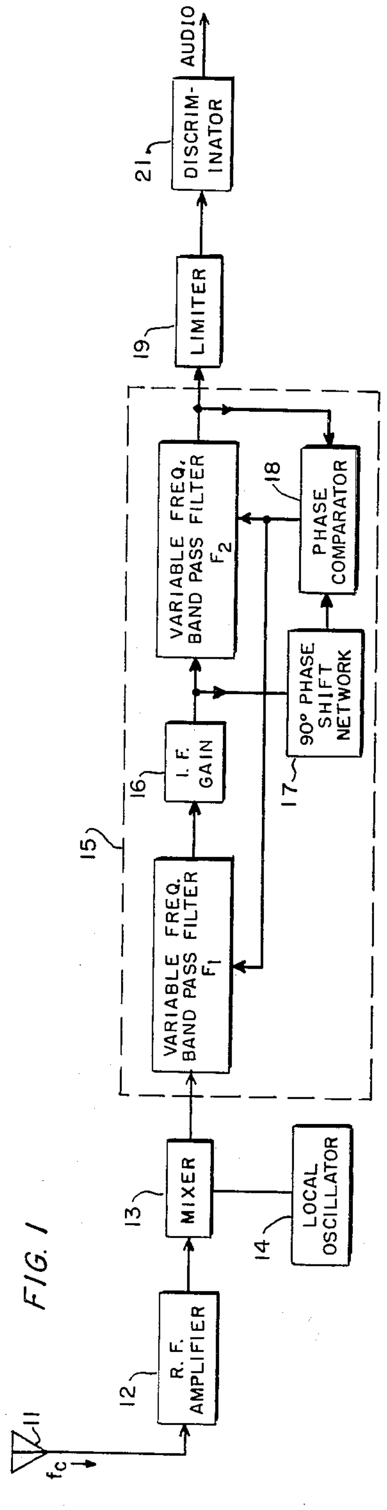
Figure 2:
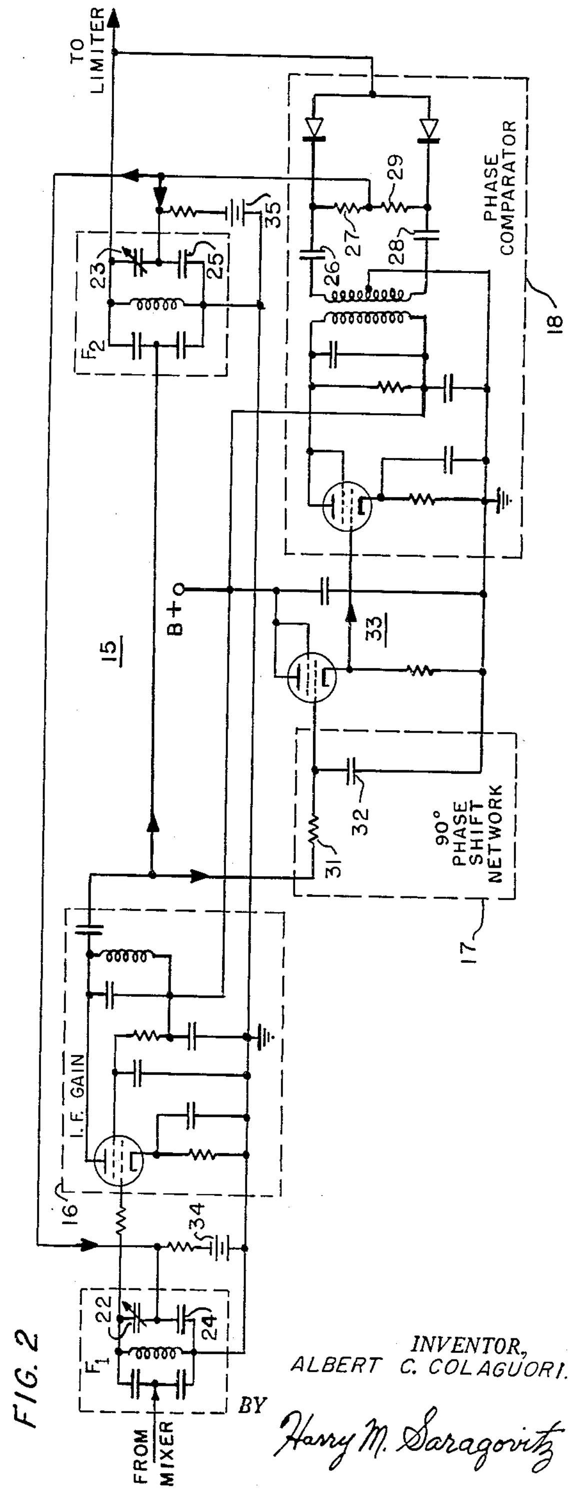

The exact nature of the invention as well as other objects and advantages thereof will be readily apparent from consideration of the following specification relating to the annexed drawings in which:

Figure 1 is a block diagram of the basic frequency-modulation receiver of the present invention; and Figure 2 is a schematic diagram of a preferred embodiment of the tunable narrow-band intermediate-frequency system used in the frequency-modulation receiver of Figure 1.

Referring now to the drawings, wherein like reference characters designate like or corresponding parts throughout the several views, there is shown in Figure 1 an antenna 11 for receiving a frequency-modulated radio signal and applying it to a radio-frequency amplifier 12. A mixer 13 receives the output signal from amplifier 12 and from local oscillator 14 and developes at its output an intermediate-frequency signal which is applied to tunable narrow-band intermediate-frequency system 15.

Tunable narrow-band intermediate-frequency system 15 comprises a first variable frequency bandpass filter $F_1$ (a highly selective tuned circuit or filter capable of being tuned electrically) for receiving the intermediate-frequency output signal of mixer 13 and passing it via an intermediate-frequency gain stage 16 simultaneously to a second variable frequency bandpass filter $F_2$ (having characteristics, similar to filter $F_1$) and to a 90 degree phase shift network 17. The outputs from variable frequency bandpass filter $F_2$ and 90 degree phase shift network 17 are applied, as shown, to phase comparator 18, from which is developed a control voltage $e_r$ which is applied to controlling elements of variable-frequency bandpass filters $F_1$ and $F_2$ to vary the center frequency of their passband while still keeping the bandwidth narrow and constant.

The intermediate-frequency output signal from variable frequency bandpass filter $F_2$ is applied through limiter 19 to discriminator 21, from which is developed an audio signal.

Tunable narrow-band intermediate-frequency system 15 will be described in detail with reference to Figure 2. Filters $F_1$ and $F_2$ are single-tuned circuits of narrow bandwidth of the order of twice the highest modulating frequency to be passed. They are capable of being tuned electrically by applying a bias control voltage to variable capacitor diodes 22 and 23, respectively, to vary their effective capacitance. This bias voltage is the control voltage developed at the output of phase comparator 18. Capacitors 25 and 26 of filters $F_1$ and $F_2$, respectively, serve to pass the intermediate-frequency signal but not the audio. Filter $F_1$ is principally used to enhance the selectively of the system and also to improve the small signal locking action by virtue of improving the signal-to-noise ratio of the input to phase comparator 18 from 90 degree phase shift network 17.

Phase comparator 18, used to compare the input and output of filter $F_2$, is conventional in design, producing a voltage which is dependent upon the relative phase of the two input signals applied to it. It is arranged to produce zero output when the relative phase between the two input signals is 90 degrees. The time constant of the phase comparator, determined primarily by capacitors 26 and 28, and resistors 27 and 29, must be short enough to pass the modulation to be detected. When the phase of the two input signals departs from 90 degrees, as is the case when the signal passing through filter $F_2$ is displaced from the center frequency of the filter passband, a voltage is developed at the output of the phase comparator. It is this voltage which is applied to control capacitor diodes 22 and 23 to tune filters $F_1$ and $F_2$ so that their center frequency is coincident with the incoming signal. The end result is that filters $F_1$ and $F_2$ follow the instantaneous frequency variations of the incoming signal.

90 degree phase shift network 17 is simply a resistor-capacitor network, comprising resistor 31 and capacitor 32, for receiving the intermediate-frequency output signal from intermediate-frequency stage 16 and shifting it 90 degrees in phase. Its output is applied through cathode-follower stage 33 to phase-comparator 18.

From the preceding discussion it can be seen that with an unmodulated carrier-frequency signal applied to antenna 11, the signal from mixer 13 will be an unmodulated intermediate-frequency signal coincident with the center frequency of filters $F_1$ and $F_2$. Under this condition the controlling voltage from phase-comparator 18 would be zero, and the capacitance of capacitors 22 and 23 would assume their normal values set by bias batteries 34 and 35.

On the other hand, when a frequency-modulated signal is applied to antenna 11, the intermediate-frequency signal applied to filter $F_2$ is no longer coincident with the center frequency of the filter. This causes phase-comparator 18 to produce a control voltage corresponding to the instantaneous frequency deviation. This voltage adds to or subtracts from the bias voltages from batteries 34 and 35 acting on capacitors 22 and 23 to shift the center frequencies of filters $F_1$ and $F_2$ in accordance with the instantaneous deviation of the incoming signal.

The ability of filters $F_1$ and $F_2$ to follow a frequency-modulated signal is dependent upon the time delay and loop gain characteristics of the system. The time delay can be made practically independent of all circuit components with the exception of filters $F_1$ and $F_2$. Therefore, it appears that there is a definite limit to the minimum bandwidth attainable, the limit being approximately twice the maximum modulating frequency that is to be received. It is to be noted that the shorter the time constant of the control circuitry the better the filters $F_1$ and $F_2$ will synchronize with the frequency modulation appearing on the carrier signal. It is conceivable that more elaborate filters with less delay than a single tuned inductance compacitance type, as shown, could be designed and used to improve this performance of the system.

It should be understood, of course, that the foregoing disclosure relates to only a preferred embodiment of the invention and that numerous modifications or alterations may be used therein without departing from the spirit and the scope of the invention as set forth in the appended claims.

What is claimed is:

1. In a communication system: filter means having the center frequency of its passband adjustable to follow the frequency of an incoming signal, phase comparing means coupled to said filter means for comparing the phase between the input and output signals of said filter means and for developing controlling information according to the deviation in the phase between said input and output signals of said filter means, and controlling means connected between said phase comparing means and said filter means for coupling said controlling information from said phase-comparing means to said filter means and for adjusting said center frequency of said filter means to follow the frequency of the incoming signal.

2. The communication system of claim 1 wherein said phase comparing means comprises a phase-shifting network and a phase comparator connected in cascade.

3. The communication system of claim 2 further including a second filter means having the center frequency of its passband adjustable to follow the frequency of an incoming signal, said second filter means connected in cascade with said first mentioned filter means, said controlling means coupling said controlling information to said second filter means to adjust said center frequency of said second filter means to follow the frequency of the incoming signal, said phase-shifting network being a 90-degree phase-shifting network.

4. In a frequency-modulation receiver: at least one single-tuned narrow-bandwidth filter having a frequency-determining component capable of being varied so that the center frequency of said filter follows the frequency of an incoming signal, a 90-degree phase-shift network connected to said filter, and a phase comparator connected between said filter and said phase-shift network to compare the input and output signals of said filter and produce a controlling voltage dependent upon the relative phase between said input and output signals, said phase comparator being connected to said frequency-determining element for applying said controlling voltage thereto to vary said center frequency of said filter according to said incoming signal.

5. In a frequency-modulation receiver: single-tuned narrow-bandwidth filters, each having as a frequency-determining component at least one variable capacitor diode capable of being varied according to a bias voltage so that the center frequency of said filters follow the frequency of an incoming signal, a 90-degree phase-shift network connected to the input of one of said filters, a phase-comparator connected between said phase-shift network and the output of said one of said filters to receive output signals therefrom and produce a controlling voltage which is dependent upon the relative phase between said output signals, said phase comparator being connected to each of said capacitor diodes for applying said controlling voltage thereto as said bias voltage to vary said center frequency of said filters according to said incoming signal.

6. A frequency-modulation receiver comprising an antenna, a radio frequency amplifier connected to said antenna, a local oscillator, a mixer connected to said local oscillator and to said radio frequency amplifier, at least one narrow bandwidth filter having tuning means for adjusting the center frequency of its passband, a 90-degree phase-shift network connected to said filter, and a phase comparator connected to said filter and to said phase shift network to develop a controlling voltage depending on the difference in phase between the input and output voltages of said filter, said phase comparator applying said controlling voltage to said tuning means.

7. A frequency-modulation receiver comprising an antenna, a radio frequency amplifier connected to said antenna, a local oscillator, a mixer connected to said local oscillator and said radio-frequency amplifier, first and second single-tuned narrow bandwidth filters, tuning means for adjusting the center frequency of said filters, an intermediate-frequency gain stage being connected between said filters, said first filter connected to said mixer, a 90-degree phase-shift network, said intermediate-frequency gain stage having a portion of its output connected to said phase shift network, a phase comparator, said second filter having a portion of its output connected to said phase comparator, said phase shift network being connected to said phase comparator, said phase comparator having an output connected to said tuning means.

8. The frequency-modulation receiver of claim 7 further comprising a detection stage, wherein said tuning means comprises first and second variable capacitor diodes for tuning said first and second filter, respectively, upon said output of said phase comparator being applied thereto, and wherein said second filter is connected to said detection means to produce an output signal from said receiver.

References Cited in the file of this patent

UNITED STATES PATENTS

| | | |
|---|---|---|
| 1,725,433 | Vreeland | Aug. 20, 1929 |
| 1,926,129 | Vreeland | Sept. 12, 1933 |
| 2,134,677 | Vreeland | Oct. 25, 1938 |